(12) United States Patent
Wang

(10) Patent No.: US 6,787,035 B2
(45) Date of Patent: Sep. 7, 2004

(54) BIOREACTOR FOR TREATING WASTEWATER

(76) Inventor: Jianmin Wang, 67 Banyan Blvd., Holmdel, NJ (US) 07733

( * ) Notice: Subject to any disclaimer, the term of this patent is extended or adjusted under 35 U.S.C. 154(b) by 107 days.

(21) Appl. No.: 10/189,692

(22) Filed: Jul. 8, 2002

(65) Prior Publication Data

US 2003/0024875 A1 Feb. 6, 2003

Related U.S. Application Data

(60) Provisional application No. 60/307,161, filed on Jul. 24, 2001.

(51) Int. Cl.[7] .................................................. C02F 3/00
(52) U.S. Cl. .................... 210/620; 210/621; 210/622; 210/623; 210/629; 210/521; 210/758; 210/220; 210/532.2
(58) Field of Search ........................ 210/521, 620–623, 210/629, 758, 220, 532.2, 632

(56) References Cited

U.S. PATENT DOCUMENTS

| | | | | |
|---|---|---|---|---|
| 3,051,315 A | * | 8/1962 | Boester | 210/195.4 |
| 3,694,353 A | * | 9/1972 | Yang | 210/608 |
| 5,342,516 A | * | 8/1994 | Rachak | 210/218 |
| 5,494,527 A | * | 2/1996 | Ludwig et al. | 134/3 |
| 5,569,376 A | * | 10/1996 | Graves | 210/195.4 |
| 5,871,647 A | * | 2/1999 | Lord | 210/615 |
| 6,360,898 B1 | * | 3/2002 | Nurse et al. | 210/435 |
| 6,638,420 B2 | * | 10/2003 | Tyllila | 210/86 |

* cited by examiner

*Primary Examiner*—Chester T. Barry

(57) ABSTRACT

A bioreactor that has an internal sludge return function for treating wastewater is provided. Said bioreactor comprises a mixing zone (18), a static zone (28), and a mixed liquor circulation channel (26). The internal sludge return is accomplished by the integration of said static zone (28) that settles sludge, and said mixed liquor circulation channel (26) that provides a circulating stream of the mixed liquor for carrying settled sludge back to the mixing zone (18). Therefore, the microorganism concentration in the bioreactor of this invention is increased compared with conventional suspended-growth bioreactors, resulting in the improved wastewater treatment performance, reduced bioreactor size, simplified operation, reduced clarifier size, etc. The bioreactor of this invention can be operation in aerobic, anoxic, and anaerobic conditions to serve various wastewater treatment purposes.

6 Claims, 2 Drawing Sheets

BIOREACTOR FOR TREATING WASTEWATER

CROSS-REFERENCE TO RELATED APPLICATION(S)

This application claims the benefits of U.S. Provisional Patent Application Ser. No. 60/307,161, filed Jul. 24, 2001.

FEDERALLY SPONSORED RESEARCH/DEVELOPMENT

Not Applicable

SEQUENCE LISTING OR PROGRAM

Not Applicable

BACKGROUND

1. Field of Invention

This invention relates to an apparatus and method for treating wastewater, specifically to a biological reactor and biological process for treating wastewater comprising organic pollutants and/or wastewater nutrients under aerobic, anoxic, or anaerobic conditions.

2. Description of Prior Art

The wastewater containing organic pollutants is usually treated using a biological process. The suspended-growth process, which is also known as the activated sludge process, is one of the most widely used biological processes. For example, most municipal wastewater treatment plants employ the activated sludge process in their secondary treatment stage for removing organic pollutants from the wastewater. The conventional activated sludge process comprises a suspended-growth bioreactor (conventionally referred as the aeration tank when operated in aerobic conditions) and a clarifier (conventionally referred as the secondary clarifier). The wastewater and the return activated sludge from the clarifier flow into the aeration tank. Air or oxygen is supplied to the aeration tank through an aeration system. In the aeration tank, pollutants are either degraded or adsorbed by the activated sludge. The aeration tank mixed liquor then enters the clarifier for solid-liquid separation. The supernatant of the clarifier is discharged through the clarifier outlet. Most of the settled sludge in the clarifier is returned back to the aeration tank. Excess sludge is wasted to a sludge handling system for further treatment.

In most cases, the wastewater also contains organic nitrogen, ammonia, and phosphorus. They are called wastewater nutrients because they can cause the excessive growth of algae in the receiving water body. In addition, the organic nitrogen and ammonia consume oxygen in the receiving water body during their oxidation. These wastewater nutrients can also be removed in the bioreactor. Microorganisms can convert organic nitrogen and ammonia to nitrate or nitrite under aerobic conditions. This process is called nitrification. If the bioreactor is under anoxic or anaerobic conditions (no dissolved oxygen (DO) presents), microorganisms can reduce the nitrate and nitrite to nitrogen gas. This process is called de-nitrification. If the bioreactor is maintained in low DO aerobic conditions, simultaneous nitrification/de-nitrification can be achieved. If the aerobic sludge continuously passes through an anaerobic or anoxic zone in the bioreactor, a group of microorganisms favorable for phosphorus uptake can be acclimated.

Microorganisms are work force for pollutant removal. The performance of the bioreactor can be enhanced if the activated sludge concentration is increased.

In conventional continuous-flow suspended-growth bioreactors, the microorganism population is maintained through the return of the concentrated activated sludge from the clarifier. Thus, the microorganism concentration in the bioreactor is dependent on the suspended solids concentration in the return activated sludge and the sludge return rate.

The clarifier is designed to clarify the bioreactor outflow using gravity settling. The performance of the clarifier is dependent on the hydraulic loading and total solids mass entering the clarifier. Increasing the sludge return rate may initially increase the microorganism concentration in the bioreactor. However, this may increase the hydraulic and solids loadings to the clarifier because of the increased effluent flow rate from the bioreactor and the increased sludge concentration in the effluent. Therefore, the clarifier performance could be reduced, resulting in the increased solids concentration in the clarifier effluent, decreased solids concentration in the return activated sludge, and the increased sludge blanket level in the clarifier. This could cause the system failure.

Objects and Advantages

Accordingly, the objects and advantages of my invention are:

(a) to provide a bioreactor that has an internal sludge return function to supplement the conventional sludge return practice to maintain a higher microorganism concentration in the bioreactor and improve the bioreactor performance;

(b) to reduce the sludge return rate from the clarifier to simplify the operation and save energy;

(c) to reduce the total hydraulic loading and solids loading to the clarifier to improve the clarifier performance, i.e., improve the clarifier effluent quality and increase the solids concentration in the clarifier underflow.

Further objects and advantages of my invention will become apparent from a consideration of the drawings and ensuing description.

SUMMARY OF THE INVENTION

The present invention is a suspended-growth bioreactor that has an internal sludge return function to supplement the sludge return from the clarifier for treating wastewater. Said bioreactor comprises a mixing zone for pollutant degradation, a static zone for sludge settling and thickening, and a mixed liquor circulation channel that provides a continuous circulation flow for carrying the settled sludge from the static zone to the mixing zone. Thus, the bioreactor of this invention can maintain a higher microorganism concentration than conventional suspended-growth bioreactors, resulting in improved wastewater treatment performance.

The bioreactor of this invention can be maintained in normal aerobic conditions to enhance organic matter removal and/or nitrification. It can also be maintained in low DO aerobic conditions for simultaneous organic matter degradation, nitrification, and de-nitrification. It can also be maintained in anoxic conditions for de-nitrification.

Moreover, it can be maintained in anaerobic conditions for anaerobic degradation of organic pollutants. More than one bioreactor of this invention, which may be operated in different conditions, can be connected in series for wastewater treatment.

BRIEF DESCRIPTION OF THE DRAWINGS

Drawing Figures

REFERENCE NUMERALS IN DRAWINGS

Figure 1:
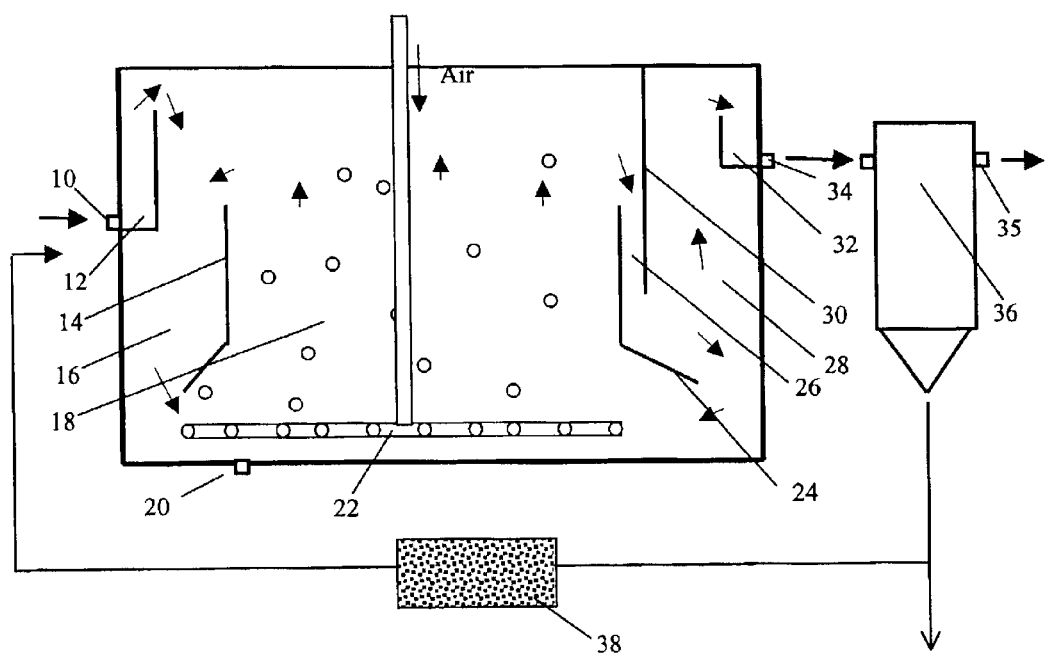
FIG. 1 illustrates a cross-sectional side view of a preferred embodiment in accordance with the present invention in conjunction with a separate clarification device.

| | | | |
|---|---|---|---|
| 10 | bioreactor inlet | 12 | inflow distribution trough |
| 14 | baffle | 16 | down flow section in the mixing zone |
| 18 | mixing zone | 20 | drain |
| 22 | mixing device | 24 | baffle |
| 26 | mixed liquor circulation channel | 28 | static zone |
| 30 | baffle | 32 | bioreactor outflow trough |
| 33 | clarifier outflow trough | 34 | bioreactor outlet |
| 34a | bioreactor outlet channel | 35 | clarifier outlet |
| 36 | clarification device | 38 | sludge return device |

DETAILED DESCRIPTION OF THE INVENTION

Description

The following description is intended to refer to specific embodiments of the invention illustrated in the drawings and is not intended to define or limit the invention, other than in the appended claims. Also, the drawings are not to scale and various dimensions and proportions are contemplated.

The increase of microorganism concentration in the bioreactor usually increases the bioreactor performance for wastewater treatment. Conventional suspended-growth bioreactors rely only on the concentrated activated sludge returned from the clarifier for maintaining a certain microorganism population for wastewater treatment. However, the increase of the sludge return rate from the clarifier does not always increase the microorganism concentration in the bioreactor. Rather, it will increase the hydraulic loading and solids loading to the clarifier, which may reduce the effluent quality and the solids concentration in the clarifier under flow, and may cause the system to fail in some circumstances. As a result, the conventional suspended-growth bioreactor cannot maintain a high microorganism concentration for more effective wastewater treatment.

One solution to increase the microorganism concentration in the suspended-growth bioreactor is to add an internal sludge return function to the bioreactor to supplement the sludge return from the clarifier. Thus, the microorganism concentration can be increased, resulting in improved wastewater treatment performance. Moreover, the sludge return rate from the clarifier can be reduced, resulting in simplified operation and reduced energy cost for sludge return. The decrease of the sludge return rate also results in reduced hydraulic loading and solids loading to the clarifier, which will improve the clarifier effluent quality and increase the solids concentration in the return sludge.

FIG. 1 illustrates a cross-sectional side view of a preferred embodiment of the present invention and a separate clarification device. As shown in FIG. 1, baffles 24 and 30 separate the bioreactor of this invention into a mixing zone 18, a static zone 28, and a mixed liquor circulation channel 26. Said mixing zone 18 comprising a mixing device 22 is located between the inlet side of the bioreactor and the baffle 24, said static zone 28 is located between the outlet side of the bioreactor and the baffle 30, and said mixed liquor circulation channel 26 is located between baffles 24 and 30. Inflow distribution trough 12 connects the bioreactor inlet 10 in bioreactor inlet side. The mixing zone 18 comprises a down flow section 16 that created by a baffle 14 located near the influent distribution trough 12. The mixed liquor circulation channel 26 connects the static zone 28 and the mixing zone 18 at the bottom of the static zone. A bioreactor outflow trough 32 connected with a bioreactor outlet 34 is located in the upper portion of the static zone 28. Said bioreactor outlet 34 connects a separate clarification device 36 at the downstream. A sludge return device 38 connects said clarification device 36 with the bioreactor inlet 10 or the mixing zone 18. A drain 20 is located at the bottom of the bioreactor.

Figure 2:
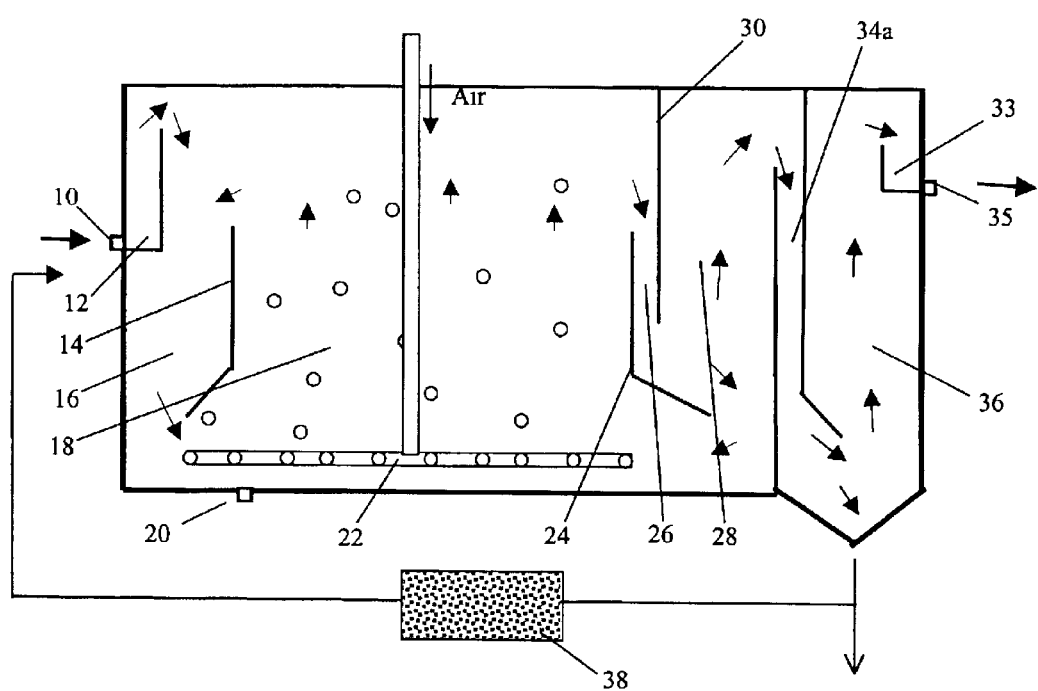
FIG. 2 illustrates a cross-sectional side view of a second embodiment in accordance with the present invention that includes an integrated clarification device.

FIG. 2 illustrates a cross-sectional side view of a second embodiment in accordance with the present invention when the bioreactor and the clarification device are integrated into one unit. A baffle assembly is used to separate the bioreactor static zone 28 and the clarification device 36. A bioreactor outlet channel 34a formed by said baffle assembly connects the bioreactor and the clarification device 36. A clarifier outflow trough 33 connected with a clarifier outlet 35 is located in the upper portion of the clarification device.

Operation

As shown in FIG. 1, wastewater first enters the bioreactor through the bioreactor inlet 10 and the inflow distribution trough 12. In the mixing zone 18, microorganisms are suspended by a mixing device 22, shown is an aeration device. The down flow section 16 in the mixing zone 18 provides a better circulation and mixing for the bioreactor.

The mixing device 22 also creates a downward flow stream of the mixed liquor in the mixed liquor circulation channel 26. The downward flow stream of the mixed liquor returns to the mixing zone 18 at the bottom of the static zone 28.

After treatment, the mixed liquor enters the static zone 28 at the lower portion of the static zone through the mixed liquor circulation channel 26. Some sludge solids are settled and thickened at the static zone 28 and thus are not carried over to the clarification device by the outflow. The settled sludge is then carried back to the mixing zone 18 by the downward flow stream of the mixed liquor originated from the mixed liquor circulation channel 26. Thus, the microorganism concentration in the bioreactor is increased. The integration of the static zone 28 and the mixed liquor circulation channel 26 accomplishes the internal sludge return process.

The outflow enters the bioreactor outflow trough 32 located in the upper portion of the static zone 28, and then enters a clarification device 36 through the bioreactor outlet 34 for solid-liquid separation. Concentrated sludge in said clarification device 36 is then returned back to the bioreactor by a sludge return device 38. Clarified water flows out of said clarification device 36 through the clarifier outlet 35. Excess sludge is discharged out of the clarifier for further treatment.

As shown in FIG. 2, the bioreactor outflow enters the clarification device 36 through the bioreactor outlet channel 34a, which is formed by a baffle assembly that separates the bioreactor static zone and the clarification device. Solids in the bioreactor outflow are removed in the clarification device 36. Clarified water is then collected by a clarifier outflow trough 33, and discharged out of the clarification device 36 through the clarifier outlet 35.

If the internal sludge return function can provide enough microorganisms in the bioreactor for wastewater treatment, the external sludge return from the clarification device is not needed, and thus the sludge return device 38 can be eliminated.

Depending on the treatment conditions (aerobic, anoxic, anaerobic), the mixing device 22 can be an aeration device, a mechanical mixing device, a hydraulic mixing device, etc. If an aeration device is used, the down flow section 16 in the mixing zone 18 can be air-free, which will allow it to act as an anoxic zone. Thus, de-nitrification can be achieved in the down flow section 16. The arrangement of an anoxic zone in front of an aeration zone can also improve the settling characteristics of aerobic sludge and improve the phosphorus removal efficiency. In addition to mixing, the aeration device also provides oxygen for organic matter oxidation and nitrification.

If the bioreactor is maintained in a low DO aerobic condition, the microorganisms on outer layers of the activated sludge flocs can perform organic matter oxidation and nitrification, while the microorganisms in internal layers of the activated sludge flocs can reduce the nitrite and nitrate produced by the outer layer microorganisms. Therefore, organic matter oxidation, nitrification, and de-nitrification can be achieved simultaneously in the bioreactor.

If anoxic or anaerobic conditions are maintained through other mixing devices, de-nitrification and/or organic matter anaerobic degradation can be achieved. Microorganisms in the static zone can also perform anoxic or anaerobic reactions for removing nitrate/nitrite and organic pollutants.

Several bioreactors of this invention, which may be operated in different conditions, can be connected in series for wastewater treatment. These bioreactors can complement each other and improve the wastewater treatment performance. Several connected bioreactors can also be installed in one tank separated by baffles.

Advantages

From the description above, a number of advantages of my bioreactor become evident:

(a) In the bioreactor of this invention, some sludge can be settled in the static zone and then returned back to the mixing zone, thus the microorganism concentration in the bioreactor can be increased compared with conventional suspended-growth bioreactors. As a result, the performance and effluent quality of the bioreactor can be improved.

(b) Because of the increase of the microorganism concentration, the bioreactor of this invention can be operated in a higher volumetric loading, resulting in the reduced bioreactor size and reduced construction cost.

(c) In the bioreactor of this invention, the internal sludge return function supplements the sludge returned from the clarifier, thus the sludge return rate from the clarifier can be reduced, resulting in simplified operation for sludge return. If the internal sludge function can provide enough microorganisms for wastewater treatment, the bioreactor of this invention is self-sustainable and no sludge return from the clarifier is needed. This further simplifies the operation.

(d) Since the internal sludge return in the bioreactor of this invention is accomplished by the existing mixing device, the reduction of the sludge return rate from the clarifier saves energy.

(e) The reduction of sludge return rate from the clarifier can reduce the total mixed liquor outflow rate to the clarifier, thus reduces the clarifier hydraulic loading and improves the clarifier effluent quality.

(f) In the bioreactor of this invention, some sludge solids in the bioreactor outflow are retained by the internal sludge return function. Thus, the sludge concentration in the outflow is reduced compared with the conventional suspended-growth bioreactors, resulting in reduced total sludge mass entering the clarifier. Therefore, the solids loading to the clarifier is reduced, resulting in improved clarifier effluent quality and increased solids concentration in the clarifier underflow.

(g) Because of the increase of solids concentration in the clarifier return sludge, the sludge return rate from the clarifier can be further reduced.

(h) The reduction of bioreactor outflow rate and solids concentration in the outflow makes it possible to use a smaller clarifier for solid-liquid separation, resulting in reduced construction costs for the clarifier.

(i) With the increased microorganism concentration and therefore the sludge retention time in the bioreactor of this invention, the cost-effective low DO aerobic process, which can achieve organic matter oxidation, nitrification, and de-nitrification simultaneously, can be easily operated. Because of the low dissolved oxygen level in the mixed liquor, the oxygen transfer efficiency is high. Because of the de-nitrification, the process recycles the oxygen in the nitrate and nitrite form for organic pollutant removal, which further reduces the oxygen demand. Therefore, energy cost for aeration can be reduced. Moreover, the de-nitrification reduces the nitrate and nitrite concentrations in the effluent, resulting in the improved effluent quality.

(j) Since the invention can be easily implemented, the existing suspended-growth bioreactors such as aeration tanks can be easily modified to the bioreactor of this invention by adding baffles to create the internal sludge return. Thus, the capacity of the existing wastewater treatment plants that employ suspended-growth bioreactors such as activated sludge wastewater treatment plants can be increased after very low cost modification. This avoids very costly major expansions of the existing plants and the construction of new plants once the design capacity of the existing plants is reached.

While the principles of this invention have been described in connection with certain features and embodiments, it should be understood that the present invention is not limited to the embodiments described and/or illustrated, rather it encompasses all the variants thereof which fall within the scope of the appended claims.

I claim:

1. A biological reactor apparatus for treating wastewater comprising:

(a) a tank having an inlet, an outlet, and a drain;

(b) at least two baffles separating said tank into a mixing zone, a static zone, and a mixed liquor circulation channel in the arrangement of mixing zone/baffle/mixed liquor circulation channel/baffle/static zone;

(c) said mixing zone located in the inlet side of the tank comprising at least one mixing devices;

(d) said static zone located in the outlet side of the tank;

(e) said mixed liquor circulation channel located between said mixing zone and said static zone for introducing mixed liquor to the lower portion of said static zone from upper portion of said mixing zone and providing a mixed liquor circulation flow to carry settled solids from the bottom of said static zone to said mixing zone.

2. The apparatus of claim 1, wherein the mixing zone comprises a down flow section created by a baffle adjacent to the inlet side of the tank.

3. The apparatus of claim 1, further comprising a clarification device next to the static zone in the same tank, wherein said static zone and said clarification device are separated by a baffle assembly that provides a channel for delivering static zone outflow to the clarification device.

4. A biological method for treating wastewater comprising:

(a) feeding said wastewater to a tank having an inlet, an outlet, and a drain;

(b) at least two baffles separating said tank into a mixing zone, a static zone, and a mixed liquor circulation channel in the arrangement of mixing zone/baffle/mixed liquor circulation channel/baffle/static zone;

(c) said mixing zone located in the inlet side of the tank comprising at least one mixing devices;

(d) said static zone located in the outlet side of the tank;

(e) said mixed liquor circulation channel located between said mixing zone and said static zone for introducing mixed liquor to the lower portion of said static zone from upper portion of said mixing zone and providing a mixed liquor circulation flow to carry settled solids from the bottom of said static zone to said mixing zone.

5. The method of claim 4, wherein the mixing zone comprises a down flow section created by a baffle adjacent to the inlet side of the tank.

6. The method of claim 4, wherein the tank further comprises a clarification device next to the static zone in the same tank, wherein said static zone and said clarification device are separated by a baffle assembly that provides a channel for delivering static zone outflow to the clarification device.

* * * * *